United States Patent [19]

Hyde et al.

[11] Patent Number: 5,180,448
[45] Date of Patent: Jan. 19, 1993

[54] METHOD OF LASER HARDENING CORRUGATING ROLLS

[75] Inventors: Glenn F. Hyde, Timonium, Md.; Gene J. White, Columbus, Ohio

[73] Assignee: United Container Machinery Group, Inc., Glen Arm, Md.

[21] Appl. No.: 570,936

[22] Filed: Aug. 22, 1990

[51] Int. Cl.$^5$ .............................................. C21D 1/09
[52] U.S. Cl. ................................... 148/525; 148/903; 219/121.61
[58] Field of Search ............... 148/147, 156, 903, 525; 219/121.6, 121.61, 121.62, 121.65, 121.66

[56] References Cited

U.S. PATENT DOCUMENTS

| | | | |
|---|---|---|---|
| 3,848,104 | 11/1974 | Locke | 219/121.65 |
| 4,154,565 | 5/1979 | Hyde et al. | 425/369 |
| 4,414,038 | 11/1983 | Dausinger et al. | 219/121.6 |
| 4,507,538 | 3/1985 | Brown et al. | 219/121.6 |

OTHER PUBLICATIONS

Metals Handbook, 9th Ed. vol. 4; 1981 "Laser Surface Transformation Hardening", Ole Sandven pp. 507–517.

Primary Examiner—R. Dean
Assistant Examiner—Margery S. Phipps
Attorney, Agent, or Firm—Biebel & French

[57] ABSTRACT

A method is disclosed for heat treating the flutes of a corrugating roll. A laser having a beam with a Gaussian power density distribution is provided for heating the flutes. The beam from the laser is reconfigured by an integrator lens to form a beam having a homogeneous power density distribution, which is focused upon the upper portion of a flute to be heat treated as the flute is traversed lengthwise past the beam.

17 Claims, 1 Drawing Sheet

METHOD OF LASER HARDENING CORRUGATING ROLLS

BACKGROUND OF THE INVENTION

The present invention relates generally to a method of hardening corrugating rolls and more particularly to a method of heat treating the flutes of corrugating rolls using a laser.

Corrugating rolls are typically used in machinery for manufacturing corrugated paperboard. The corrugating rolls are typically formed from an alloy steel, such as AISI 4340 steel, with a diameter of 12 inches and a length of 87 inches, and include longitudinally extending flutes which are used for forming the corrugations in paper. The number and size of the flutes may vary, however, corrugating rolls are usually provided with between 33 and 39 flutes having heights ranging from 0.187 to 0.142 inch.

The corrugating rolls typically have a hardness of approximately 40 $R_c$, and the flute tips are subject to wear as a result of sliding contact with the paper being processed by the machine and must eventually be machined back to their original dimensions or the corrugating roll must be replaced with a new one. In order to alleviate this problem, the corrugating rolls are provided with a hardened outer surface.

Typical methods of hardening the surface of corrugating rolls include plating the outer portion of the roll with a hard outer covering such as chrome, heat treating the entire roll, or heat treating only the tips of the flutes where the major portion of the wear takes place, is described in U.S. Pat. No. 4,154,565, issued to Hyde et al and assigned to the assignee of the present application.

U.S. Pat. No. 4,154,565 discloses heat treating the flutes of a corrugating roll by means of either a laser or an electron beam. In the process described by the patent for heat treating the roll by using a laser, an average hardening depth of 0.031 inch was obtained. The depth to which a flute can be hardened in the process described by this patent is limited by the temperature to which the flute can be heated by the laser beam without melting the surface material of the flute which is related to the distribution of the power density through the cross section of the beam.

A laser emits a beam having a circular cross section with a power density which varies according to a Gaussian distribution such that the power density of the beam is greatest at the center of the beam and tapers off toward the radial edges. Thus, when a Gaussian laser beam is focussed upon the flute of a roll, the extent to which the flute may be heat treated by the beam is limited by the temperature which is reached by the portion of the flute impinged upon by the center of the beam, since this portion of the flute receives the greatest amount of energy in a given time and will be subject to reaching a melting temperature before the surrounding portions of the fute.

Therefore, there is a need for a method of heat treating the flutes of a corrugating roll to the maximum possible depth using a laser beam without causing surface meting or distortion of the flutes.

SUMMARY OF THE INVENTION

The present invention provides a method of uniformly heating the tip or top portion of the flutes of a corrugating roll without melting the surface material or otherwise distorting the flute.

In a preferred embodiment of the invention, a laser having a Gaussian beam output is provided, and the beam is reconfigured to have a substantially homogeneous power density throughout its cross section. A focusing lens is positioned to focus the homogeneous beam on a flute centered within the beam and the flute is traversed longitudinally through the beam to harden the upper portion of the flute.

In a further preferred embodiment, the step of reconfiguring the Gaussian beam to a homogeneous beam is performed by an integrator lens which reconfigures the Gaussian beam into a "top hat" beam, i.e., a beam having a homogeneous power density throughout is cross section, and which focuses the beam to a square spot having a smaller cross sectional area than the circular beam emitted by the laser.

The corrugating roll may additionally be cleaned and coated with a light absorbing coating such as graphite or flat black paint, in order to increase the absorptivity of the roll material, prior to traversing the flute through the laser beam.

In the preferred embodiment, the flute is heat treated to a depth of at least 0.050 inch and preferably to a depth of 0.060–090 inch. Also, the flute is preferably hardened to a hardness of 60–62 $R_c$.

Other objects and advantages of the invention will be apparent from the following description, the accompanying drawings, and the appended claims.

DETAILED DESCRIPTION OF THE PREFERRED EMBODIMENT

Figure 1:
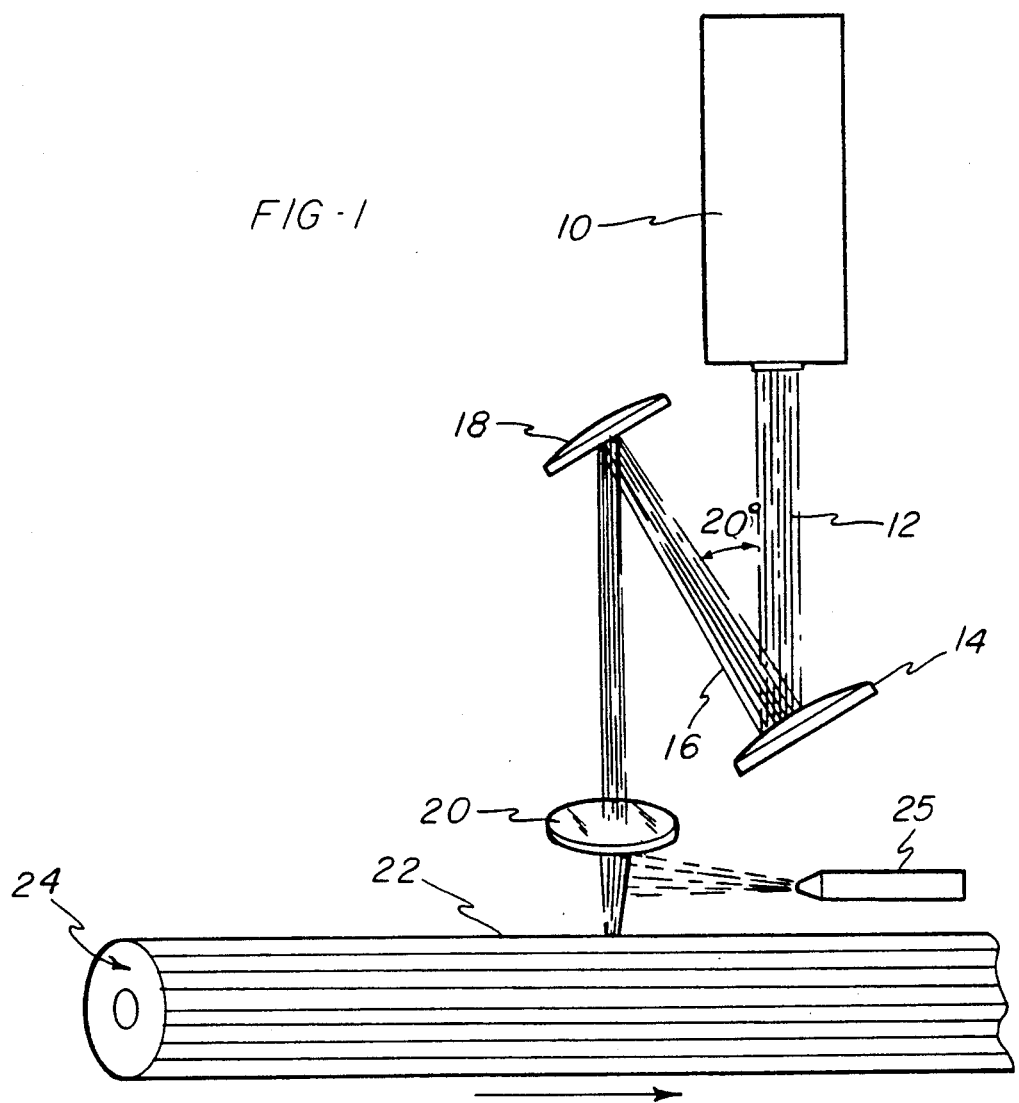
FIG. 1 is a schematic of the apparatus used to perform the method of the present invention.
Figure 2:
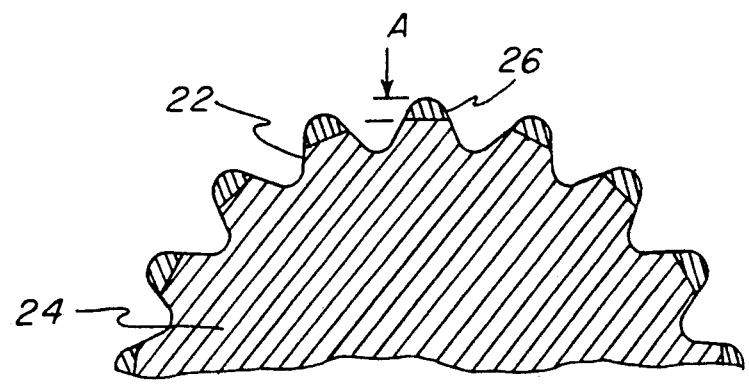
FIG. 2 is a cross sectional view of a corrugating roll with flutes which have been treated in accordance with the present invention.

The arrangement of the apparatus used in the present process is shown in schematic form in FIG. 1. A laser 10 having a Gaussian beam 12 is directed toward an integrator lens 14. The integrator lens 14 is made up of a plurality of lenses arranged in a grid with mirrors positioned in back of the lenses. The mirrors in back of the lenses are so arranged that they receive and focus a Gaussian beam 12 upon a square spot and form a homogenous or "top hat" beam 16.

The "top hat" beam 16 from the integrator lens 14 is directed to a mirror 18 which reflects it through a focusing lens 20, which focuses the beam 16 onto a flute 22 of corrugating roll 24 to be heat treated. The roll 24 with the flute 22 is then traversed lengthwise through the beam to heat treat the entire length of the flute 22.

In a preferred embodiment, a 3 kilowatt enhanced axial flow $CO_2$ laser 10, such as is manufactured by Coherent General of Sturbridge, Massachusetts, is provided having a Gaussian beam output 12 with a 1½ inch diameter circular cross section and set to provide an output power of 2.8 kilowatts. An integrator lens 14 is positioned in front of the beam 12 to reconfigure the beam 12 from the Gaussian distribution to a "top hat" beam 16, and to reflect the beam 16 back in the direction of and at a 20° angle relative to the incident beam 12. The "top hat" beam 16 is focussed to a ¾ inch square having a substantially homogeneous power density.

A mirror 18 is positioned to reflect the "top hat" beam 16 from the integrator lens 14 toward a focusing lens 20. The focusing lens has a focal length of 5½ inches and is positioned a total of 25 inches from the integrator lens 14. In addition, a flow of argon gas may be directed at the lens 20 from a gas source 25 located adjacent to the lens 20 to prevent a build-up of smoke and debris on the surface of the lens 20 which may result in damage to the lens 20.

The corrugating roll 24 to be heat treated is cleaned and coated with a light absorbing coating such as graphite or flat black paint and is positioned with a top portion 26 of a flute 22 located 10 inches from the focusing lens 20 and centered within the beam 16 from the focusing lens 20 such that a square spot 0.30 inch on each side is formed at the flute 22 and the power density at the upper tip of the flute 22 is approximately 30,000 W/in$^2$.

The roll 24 is then traversed under the beam 16 along the length of the flute 22 at a rate of approximately 50-60 inches per minute to harden the flute 22. In this manner, all of the flutes 22 on the roll 24 may be positioned under and traversed through the beam 16 to be heat treated.

Flutes heat treated by the above method may be hardened to a depth A of approximately 0.050-0.090 inch and may be hardened to an average hardness of approximately 60-62 $R_c$. Thus, the upper portion 26 of the corrugating roll flutes 22 which is subjected to the greatest amount of abrasive forces during the corrugating process may be selectively provided with a hard surface to resist wear.

The above set-up was used to heat treat a "C" type corrugating roll which typically has flutes 0.142 inch high, a chord pitch of 0.304 inch, a radius of curvature at the tips of 0.0568, and a radius of curvature at the base of the flutes of 0.0683. When the roll was traversed through the beam at a rate of 60 inches per minute, a portion of the flutes approximately 0.060 inch deep and 0.166 inch wide was heat treated to a hardness of approximately 60-62 $R_c$. This method of heat treating resulted in the flutes remaining smooth and undistorted, and only surface striations remaining from the grinding of the flutes were melted slightly.

In another use of this method, a "C" type corrugating roll was traversed through the beam at a rate of 50 inches per minute resulting in a portion of the flutes approximately 0.090 inch deep and 0.180 inch wide being heat treated to a hardness of approximately 60-62 $R_c$, with a slight, but acceptable, amount of melting on the surface of the flutes.

The method of this invention provides for the uniform heating of the top portion of a flute across its width using a laser beam. In this manner, a maximum depth of hardening is obtained while avoiding distortion of the flute during the heat treating process.

While the method herein described constitutes a preferred embodiment of the invention, it is to be understood that the invention is not limited to this precise method, and that changes may be made therein without departing from the scope of the invention, which is defined in the appended claims.

What is claimed is:

1. A method of heat treating cylindrical corrugating rolls having a plurality of flutes extending along the length thereof, said rolls being formed for use in machinery for manufacturing corrugated paperboard, comprising the steps of:
   providing a laser having a Gaussian beam output;
   reconfiguring said beam from a Gaussian beam to a beam having a substantially homogeneous power density;
   positioning a focusing lens to receive and focus said homogeneous beam to provide a focused beam having a smaller cross-sectional area than the beam emitted by said laser;
   positioning a roll to be heat treated so that said focused beam is centered on a spot on one of said plurality of flutes; said spot having a smaller cross-sectional area than the beam emitted by said laser;
   hardening said one of said plurality of flutes by causing a relative movement between said roll and said focused beam in a direction parallel to the length of said roll.

2. The method of claim 1 wherein said Gaussian beam is reconfigured to a beam forming a square spot.

3. The method of claim 2 wherein said reconfiguring step is performed by an integrator lens.

4. The method of claim 3 wherein said method further comprises the step of coating said plurality of flutes with a light absorbing coating.

5. The method of claim 4 wherein said light absorbing coating is graphite.

6. The method of claim 1 wherein only a top portion of said flute is heat treated.

7. The method of claim 6 wherein said flute is heat treated to a depth of at least 0.050 inch.

8. The method of claim 7 wherein said flute is heat treated to a depth of approximately 0.060 inch.

9. The method of claim 8 wherein a portion of said flute approximately 0.166 inch wide is heat treated.

10. The method of claim 7 wherein said flute is heat treated to a depth of approximately 0.090 inch.

11. The method of claim 10 wherein a portion of said flute approximately 0.180 inch wide is heat treated.

12. The method of claim 7 wherein said flute is hardened to an average hardness of approximately 60-62 $R_c$.

13. The method of claim 6 wherein said beam from said focusing lens has a power density of approximately 30,000 W/in$^2$, at said top portion of said flute.

14. The method of claim 13 wherein said step of causing relative movement between said roll and said focused beam occurs at a rate of approximately 50-60 inches/minute.

15. The method of claim 1 wherein a flow of gas is directed at said focusing lens.

16. The method of claim 15 wherein said gas is argon.

17. A method of heat treating cylindrical corrugating rolls having a plurality of flutes extending along the length thereof, said rolls being formed for use in machinery for manufacturing corrugated paperboard, comprising the steps of:
   providing a $CO_2$ laser having a circular Gaussian beam output with a 1½ inch diameter and an output power of 2.8 kW;
   positioning an integrator lens in front of said beam to reconfigure said beam from said Gaussian beam to a top hat beam, said top hat beam being focused to a ¾ inch square having substantially homogeneous power density throughout its cross sectional area;
   positioning a focusing lens 25 inches from said integrator lens to receive and focus said top hat beam, said focusing lens having a focal length of 5½ inches;
   coating a roll to be heat treated with a light absorbing coating;

positioning said roll with a top portion of a first flute thereof located 10 inches from said focusing lens and centered within the beam from said focusing lens such that a square spot approximately 0.30 inch on each side is formed at a top portion of said flute, said square spot having a power density of approximately 30,000 W/in$^2$; said cross-sectional area being smaller than the beam emitted by said laser;

hardening said flute by traversing said roll under said beam along the length of said flute at a rate of approximately 60 inches/minute to a depth of approximately 0.060 inch and a width across said flute of approximately 0.166 inch and to an average hardness of approximately 60–62 R$_c$; and repeating said steps for each flute on the roll.

* * * * *